(12) United States Patent
Vandermeer

(10) Patent No.: US 6,814,131 B2
(45) Date of Patent: Nov. 9, 2004

US006814131B2

(54) INVESTMENT CASTING MOLD AND METHOD OF MANUFACTURE

(75) Inventor: John Vandermeer, Newark, DE (US)

(73) Assignee: Buntrock Industries, Inc., Williamsburg, VA (US)

(*) Notice: Subject to any disclaimer, the term of this patent is extended or adjusted under 35 U.S.C. 154(b) by 0 days.

(21) Appl. No.: 10/005,881

(22) Filed: Nov. 8, 2001

(65) Prior Publication Data

US 2003/0168200 A1 Sep. 11, 2003

Related U.S. Application Data

(60) Provisional application No. 60/247,935, filed on Nov. 10, 2000.

(51) Int. Cl.[7] ............................... B22C 1/00; B22C 9/04
(52) U.S. Cl. ........................................ 164/519; 164/361
(58) Field of Search ................................ 164/516, 517, 164/518, 519, 361

(56) References Cited

U.S. PATENT DOCUMENTS

| | | |
|---|---|---|
| 2,806,270 A | 9/1957 | Shaul |
| 2,829,060 A | 4/1958 | Emblem |
| 3,396,775 A | 8/1968 | Scott |
| 3,455,368 A | 7/1969 | Shepherd |
| 3,748,157 A | 7/1973 | Moore |
| 3,751,276 A | 8/1973 | Beyer |
| 3,878,034 A | 4/1975 | Bover et al. |
| 4,352,390 A | 10/1982 | Larson |
| 4,531,705 A | 7/1985 | Nakagawa et al. |
| 5,198,006 A | 3/1993 | Mimori et al. |
| 6,000,457 A | 12/1999 | Vandermeer |
| 6,450,243 B1 | 9/2002 | Shaw et al. |

FOREIGN PATENT DOCUMENTS

| | | |
|---|---|---|
| EP | 207864 | 5/1991 |
| GB | 2350810 | 4/2001 |

OTHER PUBLICATIONS

Rusher, Cast Metals Research Journal, vol. 10, No. 4, 1974, pp. 149–153.
Rusher, Cast Metals Research Journal, vol. 11, nol 4, 1954, pp. 21–26.

*Primary Examiner*—Kuang Y. Lin
(74) *Attorney, Agent, or Firm*—Law Offices of John A. Parrish

(57) ABSTRACT

The invention relates to a investment casting molds and their method of manufacture. The method entails mixing refractory fiber, glass fiber, and refractory filler to form a dry blend; mixing the dry blend with an aqueous colloidal silica sol to form a refractory prime coat slurry, and employing the refractory slurry to produce an investment casting mold.

17 Claims, 1 Drawing Sheet

INVESTMENT CASTING MOLD AND METHOD OF MANUFACTURE

FIELD OF THE INVENTION

This invention relates to improved methods and compositions for investment casting technology.

BACKGROUND OF THE INVENTION

Investment casting by the lost wax process can be traced to ancient Egypt and China. The process as practiced today, however, is a relatively new technology dating to the 1930's and represents a rapidly growing business and science. Investment casting technology simplifies production of complex metal shapes by casting molten metal into expendable ceramic shell molds formed around disposable wax patterns which duplicate the desired metal shape. "Precision Investment Casting", i.e., PIC, is the term in the art that refers to this technology.

The Conventional PIC Process Employs Six Major Steps:

(1) Pattern Preparation.

A disposable positive pattern of the desired metal casting is made from a thermoplastic material such as wax that will melt, vaporize or burn completely so as not to leave contaminating residues in the de-waxed ceramic shell mold. The positive pattern is prepared by injecting the thermoplastic material into a negative, segmented, metal die or "tool" designed to produce patterns of the shape, dimension and surface finish required for the metal casting. Single or multiple patterns can be assembled by fusing them to a disposable wax "sprue system" that feeds molten metal to fill the shell mold;

(2) Shell Mold Construction By:

(a) dipping the pattern assembly into a refractory slurry having fine particulate refractory grain in an aqueous solution of alkali stabilized colloidal silica binder to define a coating of refractory material on the pattern;

(b) contacting the refractory coating with coarse dry particulate refractory grain or "stucco" to define a stucco coating, and (c) air drying to define a "green" air dried insoluble bonded coating. These process steps can be repeated to build by successive coats a "green", air dried shell mold of the desired thickness.

(3) Dewaxing—The disposable wax pattern is removed from the "green" air dried shell mold by steam autoclaving, plunging the green shell mold into a flash de-waxing furnace heated to 1000° F.–1900° F., or by any other method which rapidly heats and liquefies the wax so that excessive pressure build-up does not crack the shell mold.

(4) Furnacing—The de-waxed shell mold is heated at about 1600° F.–2000° F. to remove volatile residues and form stable ceramic bonds in the shell mold.

(5) Pouring—The heated shell mold is recovered from the furnace and positioned to receive molten metal. The metal may be melted by gas, indirect arc, or induction heating. The molten metal may be cast in air or in a vacuum chamber. The molten metal may be poured statically or centrifugally, and from a ladle or a direct melting crucible. The molten metal is cooled to produce a solidified metal casting in the mold.

(6) Casting recovery—The shell molds having solidified metal castings therein are broken apart and the metal castings are separated from the ceramic shell material. The castings can be separated from the sprue system by sawing or cutting with abrasive disks. The castings can be cleaned by tumbling, shot or grit blasting.

Investment casting shell molds tend to be fragile and prone to breakage. In an effort to improve the strength of investment casting shell molds, small amounts of chopped refractory fibers and chopped organic fibers have been added to aqueous refractory slurries. Refractory slurries which include these have small amounts of chopped refractory fibers enable application of thicker coatings to a preform. These slurries, however, require significant amounts of polymer to achieve satisfactory green strength and flow properties of the slurry.

A need therefore exists for materials and methods which provide investment casting shell molds which have improved strength and avoids the disadvantages of the prior art.

SUMMARY OF THE INVENTION

The invention relates to a process for rapidly forming a ceramic shell mold on a disposable support member, and to the ceramic shell molds obtained thereby. The process entails forming a dry blend that includes refractory fiber, glass fiber and refractory filler. The dry blend then is mixed with an aqueous colloidal silica sol binder to form a refractory slurry. The refractory slurry then can be used in the manufacture of ceramic shell molds.

The invention relates to a method of manufacture of an investment casting mold. The method entails mixing refractory fiber, glass fiber, and refractory filler to form first dry blend; mixing the first dry blend with an aqueous colloidal silica sol to form a refractory prime coat slurry; mixing refractory filler, glass fiber and refractory fiber to form a second dry blend, mixing the second dry blend with an aqueous colloidal silica sol to form a refractory back-up coat slurry which may be the same or different from the refractory prime coat slurry; applying a coating of the prime coat slurry onto an expendable pattern to produce a prime coated preform; applying a stucco of refractory material onto the prime coated preform; drying the stuccoed, prime coated preform; applying a coating of refractory back-up coat slurry onto the stuccoed, prime coated preform to produce a refractory back-up coated preform; applying a stucco of refractory material onto the back-up coated preform to produce a stuccoed, back-up coated preform; drying the stuccoed, refractory back-up coated preform; removing the expendable pattern from the refractory back-up coated preform to produce a green shell mold; and heating the green shell mold to a temperature sufficient to produce a ceramic shell mold. The refractory fiber can be a ceramic fiber and the refractory filler can include ceramic grains. The ceramic fiber can be present in an amount of about 1 wt. % to about 10 wt. % by weight of the dry blend, the glass fiber can be preseent in an amount of about 0.5 wt. % to about 10 wt. % by weight of the dry blend, and the refractory filler can be present in an amount of about 80 wt. % to about 98.5 wt. % by weight of the dry blend. The dry blend can further include a polymeric fiber.

Where the dry blend includes a polymeric fiber, the ceramic fiber can be present in an amount of about 1 wt. % to about 10 wt. % by weight of the dry blend, the glass fiber can be present in an amount of about 0.5 wt. % to about 10 wt. % by weight of the dry blend, and the refractory filler can be present in an amount of about 80 wt. % to about 98.5 wt. % by weight of the dry blend, and the polymeric fiber can be present in an amount of about 0.3 wt. % to about 4 wt. % by weight of the dry blend.

The process of the invention offers a number of advantages for the manufacture of ceramic shell molds over the prior art. For example, forming dry blends of fibers and refractory filler enables easy addition of refractory filler and fibers to the colloidal silica sol binder without the need to continuously mix or re-mix the silica sol and fiber pre-blend prior to use. Another advantage is that the fibers do not need to be pre-dispersed in a liquid binder or combined with a polymer prior to adding refractory filler. A further advantage is that polymeric binder additives are not required to achieve improved green strength. Other advantages are that the invention avoids the prior art problem of fiber agglomeration under high shear mixing and the ability to build thicker coatings per dip.

DETAILED DESCRIPTION OF THE INVENTION

Figure 1:
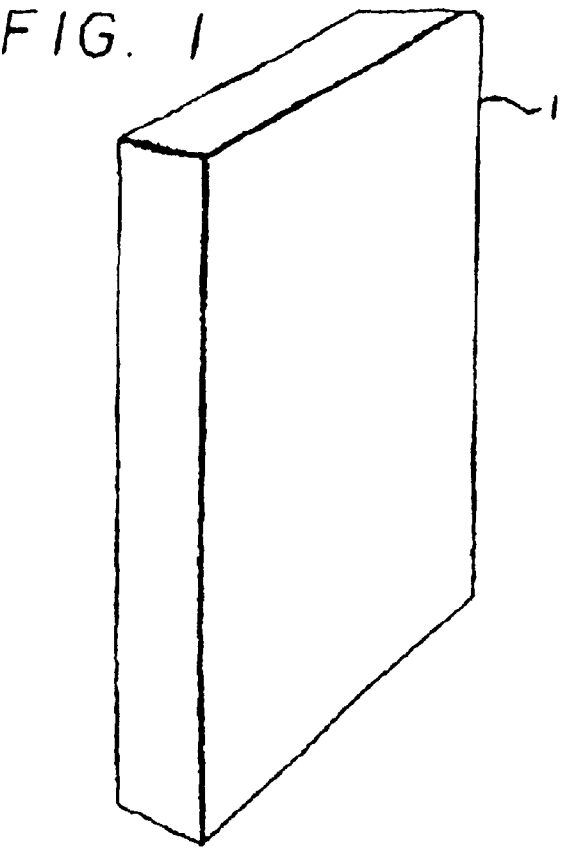
FIG. 1 illustrates a positive disposable pattern 1 of a desired metal casting.

In a first aspect of the invention, a dry blend of refractory filler, refractory fiber and glass fiber is prepared. The blend is mixed with a colloidal silica sol binder to prepare a refractory slurry. The resultant refractory slurry is used to prepare investment casting shell molds.

In another aspect, a dry blend of refractory fiber and glass fiber is formed. This dry blend is admixed with a mixture that includes an aqueous silica sol and refractory filler. The resultant refractory slurry is used to prepare investment casting shell molds.

In another aspect of the invention, a dry blend of refractory filler and glass fiber, optionally with polymeric fibers, is prepared. The dry blend is combined with a mixture of colloidal silica sol and refractory filler to produce a refractory slurry. This slurry also can be used to prepare investment casting shell molds.

In another aspect of the invention, rice hull ash is included in the dry blend that is mixed with the colloidal silica sol to form a slurry. This slurry also can be used to prepare investment casting shell molds.

Dry Blends

Refractory fillers which can be employed in the dry blends include a wide variety of materials. Examples of useful refractory fillers include but are not limited to grains such as fused silica, alumina, and aluminosilicates such as mullite, kyanite, and molochite, and mixtures thereof.

Refractory fibers which may be employed in the dry blends typically have, but are not limited to, an aspect ratio of length to width of about 20:1. Examples of useful refractory fibers include but are limited to Orleans One fiber of Wallastonite from the Orleans Resource Group, located in Quebec, Canada, NIAD G fiber of Wallastonite from NYCO Minerals Co. in Willsboro, N.Y., metal fibers, aramid fibers, carbon fibers, as well as chopped or milled ceramic fibers such as aluminosilicates such as mullite, oxides such as alumina and zirconia, nitrides such as silicon nitride, carbon, and carbides such as silicon carbide, and mixtures thereof. Chopped and milled ceramic fibers are commercially available from numerous sources such as Thermal Ceramics Corp.

Glass fibers which may be employed in the dry blends include chopped and milled glass fibers. Chopped glass fibers which may be employed include but are not limited E-glass fibers and S-glass fibers and mixtures thereof. Examples of E-glass fibers which may be employed include but are not limited to those which measure about 3 mm to about 6 mm long and have a diameter of about 10 microns such as those from PPG Industries, Shelby, N.C. under the trade name Chop Vantage 8610. Chopped glass fibers which may be employed include but are not limited to those which measure about 3 mm to about 6 mm long and have a diameter of about 10 microns such as those available from AGY Inc. Aiken, S.C. Examples of useful milled E-glass fibers include but are not limited to 731ED 3 mm floccular fibers which have a length of about 0.125 inch, an average diameter of 15.8 microns and a bulk density of 0.17 gm/cm$^3$ from Owens Corning Co.

Organic fibers which may be employed in the dry blends include a wide variety of materials such as olefins, nylon type fibers, and aramid fibers. Examples of olefins which may be used include but are not limited to polyethylene, and polypropylene such as those from Minifibers, Inc. Examples of nylon type fibers which may be used include but are not limited to those from Wex Chemical Co. Examples of aramid fibers which may be used include but are not limited to Kevlar from DuPont. Other organic fibers which may be employed include polyester fibers such as those from Wex Chemical Co. and cellulose fibers such as those from Interfibe Corp.

In the dry blends, the amounts of refractory fiber, glass fiber, refractory filler and optional polymeric fiber can be varied over a broad range. Where a dry blend includes refractory fiber, glass fiber, and refractory filler, the amount of refractory fiber may be about 1 wt. % to about 10 wt. % by weight of the dry blend, the amount of glass fiber may be about 0.5 wt. % to about 10 wt. % by weight of the dry blend, and the amount of refractory filler may be about 80 wt. % to about 98.5 wt. % by weight of the dry blend. The refractory filler may have a broad range of particle sizes such as from about 325 mesh to about 25 mesh.

Where a dry blend includes refractory fiber, glass fiber, refractory filler, and polymeric fiber, the amount of refractory fiber may be about 1 wt. % to about 10 wt. % by weight of the dry blend, the amount of glass fiber may be about 0.5 wt. % to about 10 wt. % by weight of the dry blend, and the amount of refractory filler may be about 76 wt. % to about 98 wt. % by weight of the dry blend, and the amount of polymeric fiber may be about 0.3 wt. % to about 4 wt. % by weight of the dry blend.

The silica sol binder that is combined with the dry blend to form a refractory slurry preferably is an aqueous colloidal silica sol available under the trade name Megasol® from Wesbond, Inc., Wilmington, Del. Megasol® aqueous silica sols are available in a range of pH values, titratable Na$_2$O contents, as well as solids contents. Megasol® aqueous silica sols have an average particle size of about 40 nanometer, a particle size range of about 6 nm to about 190 nm, and a standard deviation of particle sizes of about 20 nm. The pH of the Megasol® aqueous silica sols may vary from about 8.0 to about 10.0, preferably about 9.0 to about 9.5; the titratable Na$_2$O content can vary from about 0.02% to about 0.5%, preferably about 0.1% to about 0.25%, most preferably about 0.20% to about 0.22%, and a solids content of about 30% to about 50% solids content, preferably about 40 to about 47% solids content, more preferably, about 45% solids content.

As mentioned, the silica sol binder employed is Megasol® from Wesbond, Inc. However, other aqueous colloidal silica sols such as MegaPrime from Buntrock Industries, Inc. Williamsburg, Va.; Nyacol 830 from EKA Chemical Co., Nalcoag 1130 and Nalcoag 1030 from Nalco Chemical Co., as well as Ludox SM30 and Ludox HS-30 from W. R. Grace & Co., may be used.

Preparation of Refractory Slurries

Refractory slurries are formed by mixing an afore described dry blend and an aqueous silica sol binder. The amounts of dry blend and aqueous silica sol, preferably Megasol®, used to form a refractory slurry may vary over a wide range. Typically, the dry blend may be about 57 wt. % to about 64 wt. % based on the total weight of the slurry, remainder aqueous silica sol.

Manufacture of refractory slurries illustrative of the invention are described below by reference to the following non-limiting examples.

EXAMPLE 1

This Example Illustrates Forming a Refractory Slurry by Mixing a Dry Blend that Iincludes Refractory Filler, Refractory Fiber, and Glass Fiber and Mixing that Dry blend with an aqueous colloidal silica sol 100 grams Orleans One refractory fiber of Wallastonite, 20 grams 731 ED ⅛" milled E-glass fiber, and a refractory filler that includes 715 gms Fused Silica 120 (120 mesh fused silica from C-E Minerals Co., Greenville, Tenn.) and 715 gms Fused Silica 200 (200 mesh fused silica from C-E Minerals Co., Greenville, Tenn.) are dry mixed to form a dry blend.

The dry blend is mixed with 1000 gms of Megasol® that has a solids content of 45%, a pH of 9.5 and a titratable $Na_2O$ content of 0.2% to form a refractory slurry.

EXAMPLE 2

This example illustrates forming a refractory slurry by mixing a dry blend that Includes refractory filler, refractory fiber, glass fiber, and organic polymeric fiber and mixing that Dry Blend with an Aqueous Colloidal Silica Sol 100 grams Orleans One refractory fiber of Wallastonite, 20 grams 731 ED ⅛" milled E-glass fiber, a refractory filler that includes 715 gms Fused Silica 120 and 715 gms Fused Silica 200 are dry mixed with 20 grams polyethylene fiber that has a length of 1 mm and a diameter of 0.5 micron to form a dry blend.

The dry blend is mixed with 1000 gms of the Megasol® of example 1 to form a refractory slurry.

EXAMPLE 3

This Example Illustrates Forming a Refractory Slurry by Mixing a Dry Blend that Includes Refractory Filler, Refractory Fiber and Organic Polymeric Fiber and Mixing that Dry Blend with an Aqueous Colloidal Silica Sol 100 grams Orleans One refractory fiber of Wallastonite, 20 grams polyethylene fiber having a length of 1 mm and a diameter of 1 micron, and a refractory filler that includes 715 gms Fused Silica 120 and 715 gms Fused Silica 200 are dry mixed to form a dry blend.

The dry blend is mixed with 1000 gms of the Megasol® of example 1 to form a refractory slurry.

EXAMPLE 4

This Example Illustrates Forming a Refractory Slurry by Mixing a Dry Blend that Includes Refractory Filler, Glass Fiber and Organic Polymeric Fiber and Mixing that Dry Blend with an Aqueous Colloidal Silica Sol 100 grams 731 ED ⅛" milled E-glass fiber, 20 grams polyethylene fiber having a length of 1 mm and a diameter of 1 micron, and a refractory filler that includes 715 gms Fused Silica 120 and 715 gms Fused Silica 200 are dry mixed to form a dry blend.

The dry blend is mixed with 100 gms of the Megasol® of example 1 to form a refractory slurry.

EXAMPLE 5

This Example Illustrates Forming a Refractory Slurry by Mixing a Dry Blend that Includes Refractory Fiber and Glass Fiber and Mixing that Dry Blend with a Blend of an Aqueous Colloidal Silica Sol and Refractory Filler 100 grams Orleans One refractory fiber of Wallastonite and 20 grams 731 ED ⅛" milled E-glass fiber mixed dry to form a dry blend.

The dry blend is admixed with a mixture that includes 1000 gms of the Megasol of example 1 and a refractory filler that includes 715 gms Fused Silica 120 and 715 gms Fused Silica 200 to form a refractory slurry.

EXAMPLE 6

This Example Illustrates Forming a Refractory Slurry by Mixing a Dry Blend that Includes Refractory Fiber, Glass Fiber and Organic Polymeric Fiber and Mixing that Dry Blend with a Blend of an Aqueous Colloidal Silica Sol and Refractory Filler.

100 grams Orleans One refractory fiber of Wallastonite, 20 grams polyethylene fiber having a length of 1 mm and a diameter of 0.5 mm, and 100 grams 731 ED ⅛" milled E-glass fiber are mixed dry to form a dry blend.

The dry blend is admixed with a mixture that includes 1000 gms of the Megasol of example 1 and a refractory filler that includes 715 gms Fused Silica 120 and 715 gms Fused Silica 200 to form a refractory slurry.

EXAMPLE 7

This Example Illustrates Forming a Refractory Slurry by Mixing a Dry Blend that Includes Refractory Filler and Glass Fiber and Mixing that Dry Blend with an Aqueous Colloidal Silica Sol.

100 grams 731 ED ⅛" milled E-glass fiber and a refractory filler that includes 715 gms Fused Silica 120 and 715 gms Fused Silica 200 are dry mixed to form a dry blend.

The dry blend is mixed with 1000 gms of the Megasol of example 1 to form a refractory slurry.

EXAMPLE 8

This Example Illustrates Forming a Refractory Slurry by Mixing a Dry Blend that Includes Refractory Filler and Refractory Fiber with an Aqueous Colloidal Silica Sol.

100 grams Orleans One refractory fiber of Wallastonite and a refractory filler that includes 715 gms Fused Silica 120 and 715 gms Fused Silica 200 are dry mixed to form a dry blend.

The dry blend is mixed with 1000 gms of the Megasol of example 1 to form a refractory slurry.

EXAMPLE 8A

This Example Illustrates Forming a Refractory Slurry by Mixing a Dry Blend that Includes Refractory Filler and Glass Fiber with an Aqueous Colloidal Silica Sol.

20 grams 731 ED ⅛" milled E-glass fiber and a refractory filler that includes 715 gms Fused Silica 120 and 715 gms Fused Silica 200 are dry mixed to form a dry blend.

The dry blend is mixed with 1000 gms of the Megasol of example 1 to form a refractory slurry.

Preparation of Prime Coats and Back-Up Coats

Refractory prime coat slurries and refractory back-up coat slurries are prepared by placing a silica sol binder, preferably Megasol®, into a clean, water rinsed mixing tank and adding the dry blend of material while mixing. Various mixing devices known in the art may be employed in the mixing tank. These devices include, for example, propeller type mixers, jar mills, high speed dispersion mixers, and turntable fixed blade mixers. The dry blend is added while mixing until a suitable viscosity is reached.

For refractory prime coat slurries, a suitable viscosity is typically about 18–30 seconds No. 4 Zahn, preferably 20–30 sec, most preferably 24–30 sec. For refractory back-up coat slurries, suitable viscosities are about 10–18 sec. viscosity Zahn #4, preferably about 10–16 sec Zahn#4, most preferably about 12–15 sec Zahn #4. In each of the refractory prime coat slurries and refractory back-up slurries, additional mixing can be performed to remove entrapped air and to reach equilibrium.

A final viscosity adjustment can be made by adding additional Megasol® colloidal silica sol binder or refractory material. Non-ionic surfactants and anionic surfactants also can be added to the refractory slurries.

Refractory Stucco Grains

A wide variety of refractory grains may be used as stucco on refractory prime coat slurries as well as on refractory back-up coat slurries. Examples of useful refractory grains include but are not limited to mullite, calcined china clay and other aluminosilicates, vitreous and crystalline silica, alumina, zircon and chromite. The refractory grains preferably are free of ionic contaminates in amounts that can contribute to instability of the refractory grains and to thermally induce phase changes during metal casting. As is known in the art, refractory grains which are free from contaminates in amounts that can contribute to instability of the refractory grains can be produced by purification with or without calcining.

Ceramic Shell Mold

In forming a shell mold, a disposable pattern, preferably a thermoplastic pattern, more preferably a wax pattern, is dipped into a refractory prime coat slurry to coat the surface of the pattern with a continuous layer of refractory prime coat slurry. Typically, one to three coatings of a refractory prime coat slurry are applied. The refractory prime coat(s) applied can have thicknesses of about 0.02" to 0.2", preferably 0.04" to 0.2", most preferably 0.04" to 0.1". The coated pattern is drained thoroughly to remove excess slurry, and then stuccoed with fine grained, refractory stucco to produce a stuccoed prime coat. The stuccoed prime coat then is dried prior to application of an additional prime coat. A back-up coat is applied over the stuccoed prime coat. The stuccoed back-up coat then is dried prior to application of an additional back-up coat. Application of back-up coats is repeated until the resulting shell on the pattern reaches a desired thickness and strength.

The drying time between successive prime coats and back-up coats depends on the complexity of the shape of the disposable pattern. Disposable patterns which have deep cavities where airflow is minimal take longer to dry between coats. Drying can be performed at about 60° F. to about 90° F., preferably about 70° F. to about 75° F. Drying may be performed under accelerated conditions of low humidity and high temperature with rapid air movement. A thickness of ceramic shell mold of about 0.20 inch to about 0.5 inch is sufficient for most castings. Two prime coats, and 4 to 5 back-up coats typically yield a 0.25 inch thick ceramic shell mold that has a strength sufficient to withstand dewaxing and furnacing.

Materials

When a wax pattern is employed, the wax pattern preferably is formed from a filled or unfilled paraffin based investment casting grade wax, or microcrystalline wax.

Various refractory slurry compositions may be used in the refractory prime coat slurries and refractory back-up coat slurries. Specific refractory prime coat slurries and refractory back-up coat slurries are determined by the characteristics desired in the ceramic shell mold used to produce a metal casting of desired dimensions and surface finish. Useful refractory prime coat slurries employ fine size refractory grain, typically about −200 mesh to about −325 mesh. Examples of useful refractory prime coat slurries include Megasol® together with a blend of −200 mesh Fused silica and −325 mesh zircon refractory grain. The zircon refractory grain provides high resistance to molten metal. The fine particle size of the zircon also enables production of castings which have smooth, detailed surface finishes.

In refractory prime coat slurries which employ Megasol®, and a refractory filler of fused silica and zircon, the Fused silica suitably can have sizes such as about −100 mesh, about −120 mesh, about −140 mesh, about −170 mesh, about −270 mesh and about −325 mesh, most preferably about −120 to about −200 mesh. The zircon suitably can have a particle size such as about −200 mesh, about −325 mesh and about −400 mesh, preferably, about −200 mesh, most preferably about −325 mesh.

The refractory prime coat slurries optionally may include one or more non-ionic surfactants. A particularly useful non-ionic surfactant is PS9400 available from Buntrock Industries, Williamsburg, Va. This surfactant improves the ability of the refractory prime coat refractory slurry to wet the wax pattern and assists in drainage. Surfactants may be added to the refractory prime coat refractory slurry in an amount of up to about 0.2% based on the weight of the Megasol®.

Refractory back-up slurries employ coarser refractory grain sizes than are used in refractory prime coat slurries. For example, in refractory back-up slurries where Fused silica is employed as a refractory filler, the fused silica typically has a particle size of about −80 mesh to about −270 mesh, preferably about −100 mesh to about −200 mesh, most preferably, about −100 mesh to about −120 mesh.

Refractory grains for application as stucco to the prime coat include but are not limited to zircon sand of about −70 mesh to about 200 mesh, preferably about −70 to about 140 mesh. The refractory grains which may be used as stucco on the back-up coats may vary from about −10 mesh to about 200 mesh, preferably about −20 mesh to about 50 mesh. Most preferably, the refractory grains have a size of about −30 mesh to about 50 mesh.

In an alternative embodiment, a transitional stucco refractory material, preferably zircon or an alumino silicate which has a grain size intermediate between the fine grained prime coat stucco and the coarse back-up coat stucco, such as a grain size of about −50 mesh to about +100 mesh, may be applied to the prime coat-stuccoed disposable pattern prior to application of the coating of refractory back-up slurry. The transitional stucco coat can be used to add strength and to minimize the possibility of delamination between the final coating of prime coat slurry and the first coating of refractory back-up slurry.

Dewaxing

The ceramic shell molds may be dewaxed by methods such as immersion into boiling water, steam autoclaving, and flash dewaxing as is known in the art. Steam autoclaving may be performed by:

1. Using as high a steam pressure as possible, preferably about 60 PSI or higher, more preferably about 80–90 PSI.

2. Closing and pressurizing the autoclave as rapidly as possible, preferably in less than about 15 to 20 seconds.

3. Exposing the air dried green shell to the steam for about 10 to 15 minutes.

4. Slowing depressurizing the autoclave over about 30 to 60 seconds.

Flash dewaxing may be performed by plunging the air dried green shell mold into a furnace heated to about 1000° F. to about 1900° F. At these temperatures, the wax next to the wall of the ceramic shell rapidly melts so that the pressure due to expansion of the wax does not crack the ceramic shell. The ceramic shell may then be removed to a cooler temperature zone of about 200° F. to 600° F. to complete the removal of the wax. The melted wax can drain through a bottom opening in the melting chamber into a water bath or reservoir for recovery.

Furnacing

Furnacing entails heating the dewaxed ceramic shell mold to about 1600° F. to about 2000° F. to remove volatile residues and to produce a high strength, fired ceramic shell mold. The dewaxed ceramic shell mold is held in the furnace to attain thermal equilibrium, after which it is retrieved from the furnace and cast with the desired molten metal.

Manufacture of ceramic shell molds is illustrated below by reference to the following non-limiting examples:

EXAMPLE 9

An 8 inch by ⅞ inch by ⅜ inch wax bar pattern 1 as shown in FIG. 1 is dipped into the refractory slurry of example 1. For convenience, in this example, the same refractory slurry is used for both prime and back-up coats.

Wax pattern 1 is dipped into the refractory slurry for 8 seconds, removed, and allowed to drain for 10 seconds to form a first prime coat. Zircon sand that has a particle size range of −70 to 140 mesh available from DuPont Corp. is applied as stucco to the first prime coat.

The stuccoed, prime coated wax pattern is dried for 30 minutes at 75° F., and then again dipped into the refractory slurry for 8 seconds to form a second prime coat and again stuccoed with the zircon sand of −70 to 140 mesh.

Wax pattern 1 having two stuccoed prime coats then is dipped into the refractory slurry for eight seconds and drained for ten seconds. The coated product is stuccoed with Tecosil −50+100 mesh fused silica available from C-E Minerals to form an intermediate stuccoed pattern. The intermediate stuccoed pattern then is dried for 30 minutes at 75° F. The intermediate stuccoed pattern is dipped into the refractory slurry and stuccoed with Tecosil −30+50 mesh fused silica to form stuccoed backup coat. The stuccoed, back up coated pattern then is dried at 75° F. This cycle of dipping, draining, stuccoing, and drying is repeated to provide a total of five back-up coats.

Figure 2:
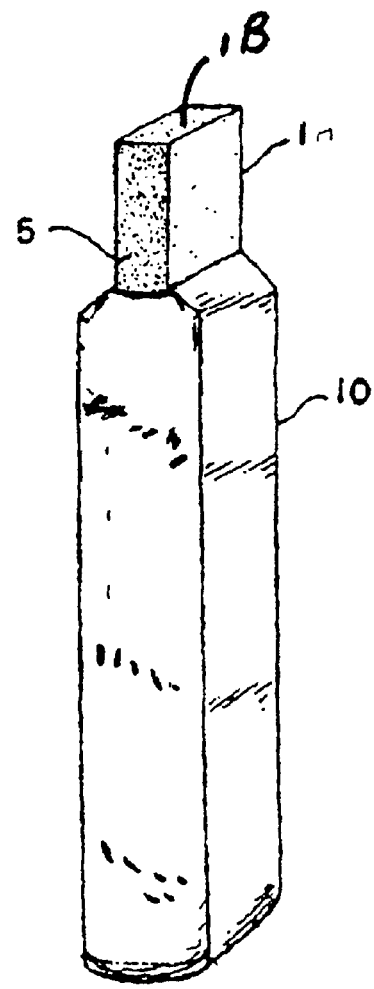
FIG. 2 is an isometric view of a green shell 10 prior to removal of pattern 1.
Figure 3:
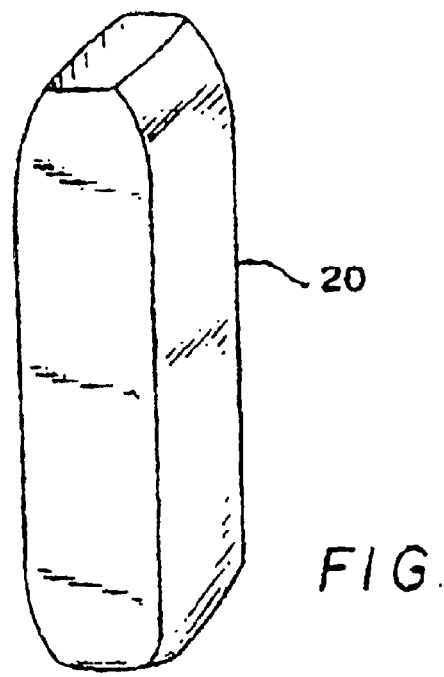
FIG. 3 is an isometric view of a dewaxed, dried green ceramic shell 20.

After application of each prime coat, intermediate coat, and back-up coat, portions of vertical sides 5 and lateral sides 1B of pattern 1 are scraped to remove the coats and stucco to produce a ceramic shell mold 10 as shown in FIG. 2. The ceramic shell mold 10 again is dipped into the refractory slurry to provide a seal coating on the pattern. The seal coated, ceramic shell mold 10 is dried at 75° F. overnight. The resulting dried, ceramic shell produced is immersed in boiling water to remove pattern 1. The resulting dewaxed, dried, green ceramic shell 20, shown in FIG. 3, is cut in half lengthwise, and dried at 75° F. for 4 hours.

$$R = (3WI)/(2bd^2)$$

where:

R=modulus of rupture in lbs/in$^2$

W=load in pounds at which the specimen failed

I=distance (span) in inches between the center-lines of the lower bearing edges b=width of specimen in inches d=depth of specimen in inches The modulus of rupture for the green shell of example 9 is 1,018 PSI. The green shell is fired at 1850° F. for one hour. The modulus of rupture of the resulting fired shell mold is 1044 PSI.

EXAMPLE 10

The process of example 9 is repeated except that the slurry of example 8 is employed. The modulus of rupture for the green shell is 688 PSI. The green shell is fired at 1850° F. for one hour. The modulus of rupture of the resulting fired shell mold is 941 PSI.

EXAMPLE 11

The process of example 9 is repeated except that the slurry of example 8A is employed. The modulus of rupture for the green shell mold of example 11 is 645 PSI. The shell mold is fired at 1850° F. for one hour. The modulus of rupture of the resulting fired mold is 694 PSI.

In another aspect of the invention, a ceramic slurry that includes rice hull ash is employed. Preferably, the rice hull ash is about 95+% amorphous silica, remainder carbon. This type of rice hull ash is available from Agrilectric Power, Inc., Houston, Tex. MegaPrime silica sol binder, available from Buntrock Industries, Inc. is employed. Use of rice hull ash with dry blends of refractory materials is illustrated in the following non-limiting examples:

EXAMPLE 12

The process of example 9 is repeated except that the refractory slurry used includes 1000 grams MegaPrime silica sol binder that has a pH of 10.5, a solids content of 40%, a titratable Na$_2$O content of 0.33%, an average particle size of about 40 nm, a particle size distribution of about 6 nm to about 190 nm, and a standard deviation of particle size of about 20 nm, and the dry blend is 1430 gram of Fused Silica 200 refractory filler. The MOR of the green shell is 621 PSI.

EXAMPLE 13

The process of example 9 is repeated except that the refractory slurry used includes 1000 grams of the MegaPrime silica sol binder of example 12, and the dry blend is 1430 gram of Fused Silica 200 refractory filler, and 200 grams of rice hull ash. The MOR of the green shell is 804 PSI.

EXAMPLE 14

The process of example 9 is repeated except that the refractory slurry used includes 1000 grams MegaPrime silica sol binder of example 12, and the dry blend is 1430 gram Fused Silica 200, 200 grams of rice hull ash, and 16 grams of 731 ED ⅛" milled E-glass fiber. The MOR of the green shell mold is 833 PSI.

EXAMPLE 15

The process of example 9 is repeated except that the refractory slurry used includes 1000 grams of the MegaPrime silica sol binder of example 12, and the dry blend is 1430 gram Fused Silica 200, 100 grams of rice hull ash, and 16 grams of 731 ED ⅛" milled E-glass fiber, and 4 grams Chop Vantage 8610 chopped ⅛" E-glass fiber. The MOR of the green shell is 1161 PSI.

EXAMPLE 16

The process of example 9 is repeated except that the refractory slurry used includes 1000 grams Megasol silica sol binder that has a pH of 9.5, a solids content of 45% and a titratable $Na_2O$ content of 0.2%, and the dry blend is 1300 grams of Fused Silica 200 and 100 grams rice hull ash. The MOR of the green shell is 831 PSI.

EXAMPLE 17

The process of example 9 is repeated except that the refractory slurry used includes 875 grams of the MegaPrime sol binder of example 12, and the dry blend is 1485 grams Fused Silica 120, 100 grams rice hull ash and 100 grams of polyethylene fiber that has a length of 1 mm and a diameter of 0.5 micron.

EXAMPLE 18

The process of example 9 is repeated except that the refractory slurry used includes 1000 grams MegaPrime silica sol binder that has a pH of 10.5, a solids content of 40%, a titratable $Na_2O$ content of 0.33%, an average particle size of about 40 nm, a particle size distribution of about 6 nm to about 190 nm, and a standard deviation of particle size of about 20 nm, and the dry blend of 1430 gram of Fused Silica 200 refractory filler and 100 grams rice hull ash.

EXAMPLE 19

The process of example 9 is repeated except that the refractory slurry used includes 1000 grams MegaPrime silica sol binder that has a pH of 10.5, a solids content of 40%, a titratable $Na_2O$ content of 0.33%, an average particle size of about 40 nm, a particle size distribution of about 6 nm to about 190 nm, and a standard deviation of particle size of about 20 nm, and the dry blend is 1430 gram of refractory filler that includes 50% 325 mesh fused silica, 25% 120 mesh fused silica, and 25% 50 mesh fused silica.

EXAMPLE 20

The process of example 19 is repeated except that 100 grams of rice hull ash also is included in the dry blend used to prepare the refractory slurry.

EXAMPLE 21

The process of example 9 is repeated except that the refractory slurry used includes 1000 grams Megasol® silica sol binder that has a solids content of 45%, a pH of 9.5 and a titratable $Na_2O$ content of 0.2%, an average particle size of about 40 nm, a particle size distribution of about 6 nm to about 190 nm, and a standard deviation of particle size of about 20 nm, and the dry blend is a mixture of refractory fiber and refractory filler. The refractory fiber is Wallastonite One fiber present in an amount of 100 grams, and the refractory filler is present in an amount 1430 gram that includes 700 gram Fused silica 120, 700 gram Fused silica 200, 100 gram Mullite 100 Mesh. The MOR is 910 psi

EXAMPLE 22

The process of example 21 is repeated except that 100 grams of rice hull ash also is included in the dry blend used to prepare the refractory slurry.

EXAMPLE 23

This example illustrates manufacture of ceramic shell molds without the use of stucco.

An 8 inch by ⅞ inch by ⅜ inch wax bar pattern 1 as shown in FIG. 1 is dipped into a refractory slurry that includes 1000 grams of the Megasol used in example 1, 2135 grams refractory filler, and 213 grams Wallastonite refractory fiber. For convenience, in this example, the same refractory slurry is used for both prime and back-up coats. The refractory filler includes 1485 grams 200 mesh fused silica, 250 grams 35 mesh mullite, and 400 grams 48 mesh mullite.

Wax pattern 1 is dipped into the refractory slurry for 8 seconds, removed, and allowed to drain for 10 seconds to form a first prime coat.

The prime coated wax pattern is dried for 30 minutes at 75° F., and then again dipped into the refractory slurry for 8 seconds to form a second prime coat.

Wax pattern 1 having two prime coats then is dipped into the refractory slurry for eight seconds and drained for ten seconds. The coated pattern then is dried for 30 minutes at 75° F. This cycle of dipping, draining and drying is repeated to provide a total of five back-up coats.

After application of each prime coat and back-up coat, portions of vertical sides 5 and lateral sides 1B of pattern 1 are scraped to remove the coats to produce a ceramic shell mold 10 as shown in FIG. 2. The ceramic shell mold 10 again is dipped into the refractory slurry to provide a seal coating on the pattern. The seal coated, ceramic shell mold 10 is dried at 75° F. overnight. The resulting dried, ceramic shell produced is immersed in boiling water to remove pattern 1 to produce a dewaxed, dried, green ceramic shell. The green shell mold then is fired at 1850° F. to produce a fired ceramic shell mold.

EXAMPLE 24

The procedure of example 23 is repeated except that the dry blend also includes 213 grams of E-glass fiber.

EXAMPLE 25

The procedure of example 23 is repeated except that the dry blend also includes 100 grams of rice hull ash.

EXAMPLE 26

The procedure of example 24 is repeated except that the dry blend also includes 100 grams rice hull ash.

What is claimed is:

1. A method of manufacture of an investment casting mold comprising, mixing refractory fiber, glass fiber, and refractory filler to form a first dry blend, mixing refractory fiber, glass fiber, and refractory filler to form a second dry blend which may be the same or different from the first dry blend, mixing the first dry blend with an aqueous colloidal silica sol to form a refractory prime coat slurry, mixing the second dry blend with an aqueous colloidal silica sol to form a refractory back-up coat slurry which may be the same or different from the refractory prime coat slurry, applying a coating of the prime coat slurry onto an expendable pattern of thermoplastic material to produce a prime coated preform, applying a stucco of refractory material onto the prime coated preform, drying the stuccoed, prime coated preform, applying a coating of the refractory back-up coat slurry onto the stuccoed, prime coated preform to produce a refractory back-up coated preform, applying a stucco of refractory material onto the back-up coated preform to produce a stuccoed, back-up coated preform, drying the stuccoed, refractory back-up coated preform, removing the expendable pattern from the refractory back-up coated preform to produce a green shell mold, and heating the green shell mold to a temperature sufficient to produce a fired ceramic shell mold.

2. The method of claim 1 wherein the refractory fiber is a ceramic fiber and the refractory filler includes ceramic grains which have a particle size of about 325 mesh to about 25 mesh.

3. The method of claim 2 wherein the ceramic fiber is about 1 wt. % to about 10 wt. % by weight of the first dry blend, the glass fiber is about 0.5 wt. % to about 10 wt. % by weight of the first dry blend, and the refractory filler is about 80 wt. % to about 98.5 wt. % by weight of the first dry blend.

4. The method of claim 1 wherein the first dry blend further includes a polymeric fiber.

5. The method of claim 4 wherein the ceramic fiber is about 1 wt. % to about 10 wt % by weight of the first dry blend, the glass fiber is about 0.5 wt % to about 10 wt. % by weight of the first dry blend, and the refractory filler is about 80 wt. % to about 98.5 wt. % by weight of the first dry blend, and the polymeric fiber is about 0.3 wt. % to about 4 wt. % by weight of the first dry blend.

6. The method of claim 5 wherein the glass fiber is selected from the group consisling of E-glass fibers and S-glass fibers, and the polymeric fiber is selected from the group consisting of olefins, nylon type fibers, and aramid fibers.

7. The method of claim 2 wherein the refractory filler further includes rice hull ash.

8. A method of manufacture of an investment casting mold comprising, mixing Wall astonite refractory fiber, glass fiber, and frised silica refractory filler to form a dry blend, mixing a portion of the dry blend with an aqueous colloidal silica sol which has a solids content of 45%, a pH of 9.5 and a titratable $Na_2O$ content of 0.2% to form a refractory prime coat slurry, mixing another portion of the dry blend with the aqueous colloidal silica sol to form a refractory back-up coat slurry, applying a coating of the prime coat slurry onto an expendable pattern of thermoplastic material to produce a prime coated preform, applying a stucco of refractory material onto the prime coated preform, drying the resulting stuccoed, prime coated preform, applying a coating of refractory back-up coat slurry Onto the stuccoed, prime coated preform to produce a refractory back-up coated preform, applying a stucco of refractory material onto the back-up coated preform to produce a stuccoed, back-up coated preform, drying the stuccoed, refractory back-up coated preform, removing the thermoplastic pattern from the refractory back-up coated preform to produce a green shell mold, and heating the green shell mold to a temperature sufficient to produce a ceramic shell mold.

9. The process of claim 8 wherein the blend includes 100 grams Wallastonite refractory fiber, 20 grams of glass fiber, and a refractory filler that includes 1430 grams fused silica.

10. The process of claim 9 wherein the dry blend is mixed with 1000 grams of the colloidal silica sol.

11. A method of manufacture of an investment casting mold comprising, mixing glass fiber, fused silica refractory filler and rice hull ash to form a dry blend, mixing a portion of the dry blend with an aqueous colloidal silica sol binder that has a pH of 10.5, a solids content of 40% and a titratable $Na_2O$ content of 0.33%, an average particle size of about 40 nm, a particle size distribution of about 6 nm to about 190 nm, and a standard deviation of particle size of about 20 nm to form a refractory prime coat slurry, mixing another portion the dry blend with the aqueous colloidal silica sol to form a refractory back-up coat slurry, applying a coating of the prime coat slurry onto an expendable pattern of thermoplastic material to produce a prime coated preform, applying a stucco of refractory material onto the prime coated preform, drying the resulting stuccoed, prime coated preform, applying a coating of refractory back-up coat slurry onto the stuccoed, prime coated preform to produce a refractory back-up coated preform, applying a stucco of refractory material onto the back-up coated preform to produce a stuccoed, back-up coated preform, drying the stuccoed, refractory back-up coated preform, removing the thermoplastic pat-tern from the refractory back-up coated preform to produce a green shell mold, and heating the green shell mold to a temperature sufficient to produce a ceramic shell mold.

12. The process of claim 11 wherein the blend includes 1430 gram fused silica, 100 grams of rice hull ash, and 20 grams of glass Fiber.

13. The process of claim 12 wherein the dry blend is mixed with 1000 grams of the colloidal silica sol.

14. A method of manufacture of an investment casting mold comprising, mixing refractory fiber and glass fiber to form a first dry blend, mixing refractory fiber and glass fiber to form a second dry blend which may be the same or different from the first dry blend, mixing the first dry blend with a mixture of aqueous colloidal silica sol and refractory filler to form a refractory prime coat slurry, mixing the second dry blend with a mixture of aqueous colloidal silica sol and refractory filler an aqueous colloidal silica sol to form a refractory back-up coat slurry which may be the same or different from the refractory prime coat slurry, applying a coating of the prime coat slurry onto an expendable pattern of thermoplastic material to produce a prune coated preform, applying a stucco of refractory material onto the prime coated preform, drying the resulting stuccoed, prime coated preform, applying a coating of the refractory back-up coat slurry onto the stuccoed, prime coated preform to produce a back-up coated preform, applying a stucco of refractory material onto the back-up coated preform to produce a stuccoed, back-up coated preform, drying the stuccoed, refractory back-up coated preform, removing the expendable pattern from the refractory back-up coated preform to produce a green shell mold, and heating the green shell mold to a temperature sufficient to produce a fired ceramic shell mold.

15. A method of manufacture of an investment casting mold comprising, maxing refractory fiber and refractory filler to form a first dry blend, mixing refractory fiber and refractory filler to form a second dry blend which may be the same or different from the first dry blend, mixing the first dry blend with an aqueous colloidal silica sol to form a refractory prime coat slurry, mixing the second dry blend with an aqueous colloidal silica sol to form a refractory back-up coat slurry which may be the same or different from the refractory prime coat slurry, applying a coating of the prime coat slurry onto an expendable pattern of thermoplastic material to produce a prime coated preform, drying the resulting stuccoed, prime coated preform, applying a coating of the refractory back-up coat slurry onto prime coated preform to produce a refractory back-up coated preform, drying the refractory back-up coated preform, removing the expendable pattern from the refractory back-up coated preform to produce a green shell mold, and heating the green shell mold to a temperature sufficient to produce a fired ceramic shell mold.

16. The process of claim 15 wherein the refractory filler includes 200 mesh fused silica, 35 mesh mullite, and 48 mesh mullite.

17. A method of manufacture of an investment casting mold comprising, mixing fiber and refractory filler to form a first dry blend, mixing fiber and refractory filler to form a second dry blend which may be the same or different from the first dry blend, mixing the first dry blend with an aqueous colloidal silica sol to form a refractory prime coat slurry, mixing the second dry blend with an aqueous colloidal silica sol to form a refractory back-up coat slurry which may be the same or different from the refractory prime coat slurry, applying a coating of the prime coat slurry onto an expendable pattern of thermoplastic material to produce a prime coated preform, applying a stucco of refractory material onto the prime coated preform, drying the resulting stuccoed, prime coated preform, applying a coating of the refractory back-up coat slurry onto the stuccoed, prime coated preform to produce a refractory back-up coated preform, applying a stucco of refractory material onto the back-up coated preform to produce a stuccoed, back-up coated preform, drying the stuccoed, refractory back-up coated preform, removing the expendable pattern from the refractory back-up coated preform to produce a green shell mold, and heating the green shell mold to a temperature sufficient to produce a fired ceramic shell mold.

* * * * *